United States Patent [19]
Endo

[11] Patent Number: 5,587,999
[45] Date of Patent: Dec. 24, 1996

[54] D CHANNEL PACKET COMMUNICATION SYSTEM AND A METHOD OF D CHANNEL PACKET COMMUNICATION

[75] Inventor: Koji Endo, Tokyo, Japan

[73] Assignee: NEC Corporation, Tokyo, Japan

[21] Appl. No.: 514,743

[22] Filed: Aug. 14, 1995

[30] Foreign Application Priority Data

Aug. 12, 1994 [JP] Japan .................................. 6-190332

[51] Int. Cl.$^6$ .............................. H04J 3/12; H04L 12/56
[52] U.S. Cl. .......................... 370/352; 379/234; 379/94; 370/426; 370/467; 370/524
[58] Field of Search ................... 370/58.1, 58.2, 370/60, 60.1, 68.1, 94.1, 94.2, 110.1; 379/93, 94, 96, 231, 234

[56] References Cited

U.S. PATENT DOCUMENTS

| | | | |
|---|---|---|---|
| H586 | 2/1989 | Kun | 370/94.1 |
| 5,008,884 | 4/1991 | Yazawa et al. | 370/110.1 |
| 5,157,660 | 10/1992 | Kuwahara et al. | 370/110.1 |
| 5,319,640 | 6/1994 | Yamasaki et al. | 370/68.1 |
| 5,442,622 | 8/1995 | Hokari | 370/68.1 |

FOREIGN PATENT DOCUMENTS 2-226844  9/1990  Japan .

Primary Examiner—Hassan Kizou
Attorney, Agent, or Firm—Young & Thompson

[57] ABSTRACT

A D channel packet communication system and a method of D channel packet communication in a private branch exchange allows connection control information conversion for a D channel packet which passes through a network, without call processor processing. The connection control information of D channel packet, such as a TEI, a LCGN and LCN, independently allocated for a communication between a packet terminal and a PBX (line side), and for a communication between the PBX and a network (network side) is adequately converted by the conversion control unit. The conversion control unit has first conversion information based on conditions of the connection control information to be used at the line side and at the network side, and derives second conversion information corresponding to each packet communication based on the first conversion information and connection control information contained in a packet of each packet communication. The D channel packet is discriminated by a switching control unit and input to the conversion control unit, and then, the connection control information contained in the D channel packet received from one side is converted by the second conversion information and transferred as the packet to the other side.

9 Claims, 10 Drawing Sheets

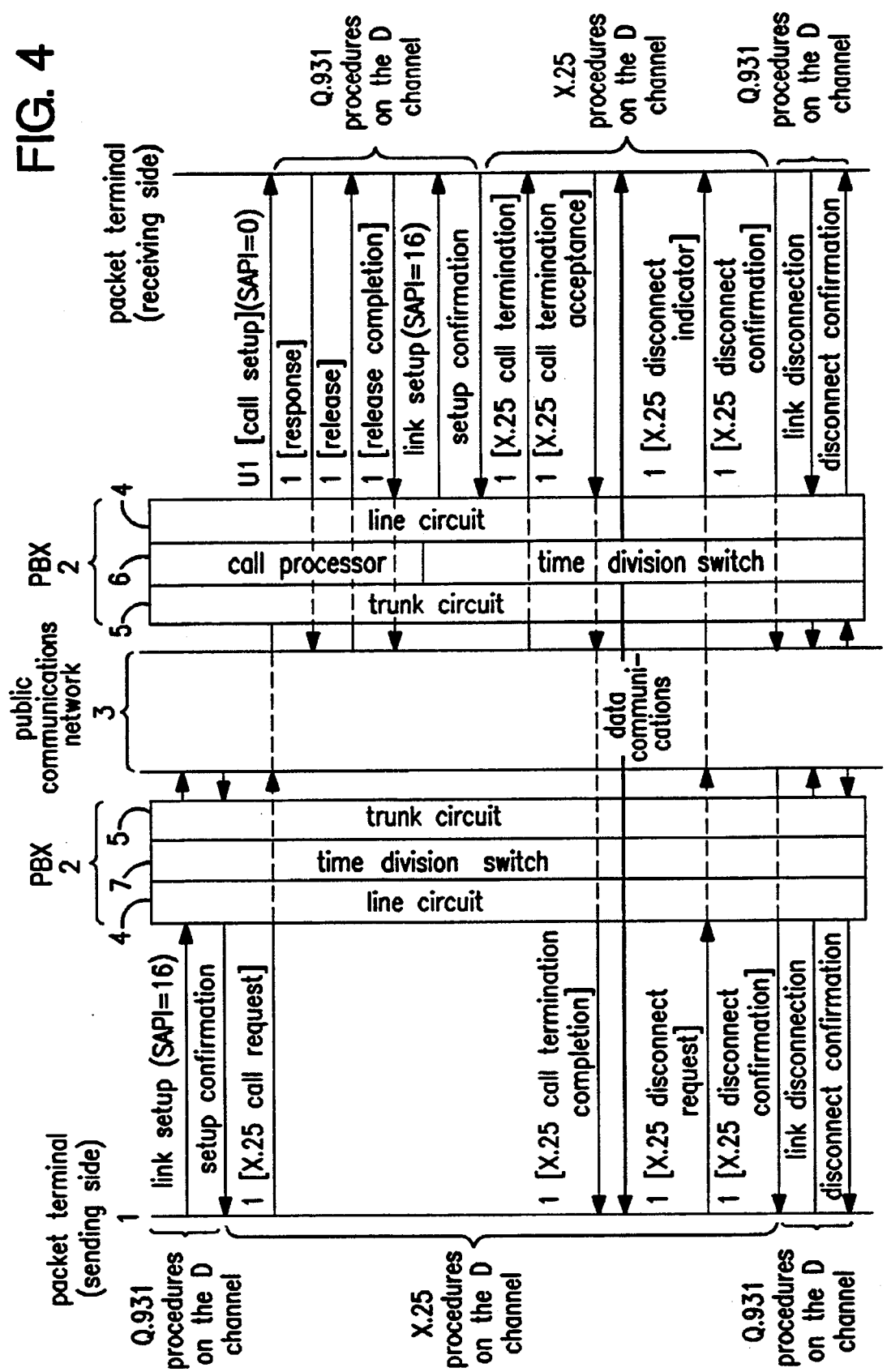

| subscriber line number |
|---|
| TEI of subscriber terminal |
| TEI of network side |
| terminal side LCGN=00 | ⎫
| type of VC/PVC | ⎬ for LCGN=00
| number of multiplexable LCNs | ⎭
| terminal side LCGN=01 | ⎫
| type of VC/PVC | ⎬ for LCGN=01
| number of multiplexable LCNs | ⎭
| terminal side LCGN=02 | ⎫
| type of VC/PVC | ⎬ for LCGN=02
| number of multiplexable LCNs | ⎭
| ≈ | ⎬ for LCGN=03 ro LCGN=13
| terminal side LCGN=14 | ⎫
| type of VC/PVC | ⎬ for LCGN=14
| number of multiplexable LCNs | ⎭
| terminal side LCGN=15 | ⎫
| type of VC/PVC | ⎬ for LCGN=15
| number of multiplexable LCNs | ⎭

FIG. 5

| TEI of network side |
|---|
| network side of LCGN=00 |
| type of VC/PVC |
| number of multiplexable LCNs |
| network side LCGN=01 |
| type of VC/PVC |
| number of multiplexable LCNs |
| network side LCGN=02 |
| type of VC/PVC |
| number of multiplexable LCNs |
| ≈ |
| network side LCGN=14 |
| type of VC/PVC |
| number of multiplexable LCNs |
| network side LCGN=15 |
| type of VC/PVC |
| number of multiplexable LCNs | for LCGN=00
for LCGN=01
for LCGN=02
for LCGN=03 ro LCGN=13
for LCGN=14
for LCGN=15

FIG. 6

D CHANNEL PACKET COMMUNICATION SYSTEM AND A METHOD OF D CHANNEL PACKET COMMUNICATION

BACKGROUND OF THE INVENTION

1. Field of the Invention

The present invention relates to a D channel packet communication system and a method of D channel packet communication, and more particularly, to a D channel packet communication system and a method of D channel packet communication for an ISDN (Integrated Services Digital Network) if a private branch exchange in which a D channel packet is discriminated by a line circuit, and connection control information contained in the D channel packet is converted and transferred to an ISDN network through a permanent connection path established in a time division switch without passing through a call processor.

2. Description of Related Art

A private branch exchange (hereafter referred to as PBX) is used in corporations, schools, hotels and some other places for providing an internal private communications network. The PBX accommodates its own terminals of telephones, data communication terminals and other kind of terminals for internal communications and communications to a public communication network. Therefore, the PBX performs switching operations for calls to and from those terminals, and establishes communication paths not only within the private communications network, but also to public communications networks.

On the other hand, a PBS may also be regarded as a subscriber terminal of a public switching system in a public communications network. That is, although the PBX itself accommodates an unspecified number of terminals, the PBS is treated as a subscriber terminal in control operations of the public switching system as far as the public communications network is concerned. Therefore, where the public communications network provides the ISDN, then a TEI (Terminal Equipment Identifier) and some other service parameters to be allocated for subscriber terminals of a public ISDN switching system are also allocated to the PBX. Those parameters are allocated to each subscriber line which interconnects a central office trunk (hereafter referred to as trunk) of the PBX and a line circuit of the public ISDN switching system depending on service conditions of the PBX as a subscriber terminal, but are not allocated to each terminal accommodated in the PBX.

FIG. 1 is a block diagram illustrating a configuration of a conventional D channel packet communication system in a PBX performing D channel packet communication without the D channel packet passing through a call processor (Japanese Laid Open Patent Application No. HEI 2-226844).

In this figure, the PBX 2 is provided with a line circuit 4 accommodating a packet terminal 1 as an internal terminal, a trunk circuit 5 connected to a public-ISDN switching system (not shown) in a public communications network 3 (hereafter referred to as network), a time division switch 7 for establishing a communication path between the line circuit 4 and the trunk circuit 5, and a call processor 6 for controlling the overall operations of the PBX 2. A switching control unit 41 is provided in the line circuit 4 and a switching control unit 51 is provided in the trunk circuit 5. Those switching control units 41 and 51 perform connecting switching for the flow of received D channel information to either side of the division switch 7 or the call processor 6.

FIG. 2 is a diagram showing the sequence of D channel packet communication performed by the conventional D channel packet communication system in the PBX 2 of FIG. 1.

When the packet terminal 1 at the sending side requests D channel packet communication, "link set up" information of D channel information is transmitted from the packet terminal 1 to the network 3 based on subscriber protocols of packet communications defined by CCITT (International Telegraph and Telephone Consultative Committee, at present ITU-T: International Telecommunication Union Telecommunication Standardization Sector) recommendations Q.931.

The "link set up" information is the information for requesting the network 3 to establish a communication path, and this information includes a SAPI (Service Access Point Identifier) of the layer 2 protocol information for indicating the mode of data communication to be followed. As the D channel packet communication based on CCITT recommendations X.25 protocol is followed in this case, a value of "16" is set in the SAPI, i.e., the "link set up" information with SAPI–15 means requesting a communication path for the communication of D channel packet based on CCITT recommendation X.25 protocol.

The switching control unit 41 of the line circuit 4 is normally connected to the call processor side, so the "link set up" information is transferred to the call processor 6 from the line circuit 4 which has received the "link set up" information and terminated the layer 2 protocol. The call processor 6 analyzes the "link set up" information and recognizes that the mode of communication requested is D channel packet communication by recognizing the value of SAPI which has been set to "16". Then, the "link set up" information is transferred from the call processor 6 to the network 3 through the trunk circuit 5.

When the network 3 responds to the "link set up" information by transmitting the "link set up confirmation" information, since the switching control unit 51 of the trunk circuit 5 is normally connected to the call processor side, the "link set up confirmation" information from the network 3 is transferred to the call processor 6 from the trunk circuit 5. Then, the call processor 6 identifies the information as a response to the "link set up" information and transfers the information to the packet terminal 1 through the switching control unit 41 of the line circuit 4.

Once the "link set up confirmation" information has been acknowledged by the circuit 4, the trunk circuit 5 and the call process 6, each of the switching control units 41 and 51 switches its connection path from the call processor side to the time division switch side, and the call processor 6 establishes a communication path between the line circuit 4 and the trunk circuit 5 in the time division switch 7 using predetermined connection information.

Throughout the procedures described above, the packet terminal 1 which has received the "link set up confirmation" information is connected to the network 3 through the line circuit, 4 the time division switch 7 and the trunk circuit 5.

Next, the packet terminal 1 transfers the "X.25 call request" information to a packet terminal at the receiving side (not shown) in the network 3 for requesting commencement of a packet communication with the X.25 protocol. When a link set up at the packet terminal of the receiving side has been completed, the "X. 25 call termination completion" information in response to the "X.25 call request" information is sent back from the packet terminal of the receiving side to the packet terminal 1 at the sending side, whereafter D channel packet communication commences.

At the end of communication, the "X.25 disconnect request" information is transferred from the packet terminal 1. When the line circuit 4 and the trunk circuit 5 recognize that the "X.25 disconnect request" information has passed therethrough, each of the switch control units 41 and 51 switches its connection path from the time division switch side to the call processor side. Therefore, the "X.25 disconnect confirmation" signal in response to the "X.25 disconnect request" signal sent from the network 3, is received by the call processor 6. The call processor 6, having received the "X.25 disconnect confirmation" signal, transfers this information to the packet terminal 1 through the switch control unit 41 of the line circuit 4. Thereafter, the call processor 6 disconnects the communication path between the line circuit 4 and the trunk circuit 5 in the time division switch 7 when the "link disconnection" information is transmitted from the packet terminal 1 based on the Q.(31 protocol.

The conventional D channel packet communication system and the method of D channel packet communication in the PBX as described above, however, have the following problems:

(1) The call processor must bear the processing load each time D channel packet communication is performed, because the call processor is required for processing the D channel information based on the Q.931 protocol;

(2) The efficiency of the time division switch is degraded because the communication path between the line circuit and the trunk circuit is established for each D channel packet communication and connection paths on the time division switch are occupied by particular packet terminals such as the PVC (Permanent Virtual Circuit) type terminal or a terminal which does not release a communication path even at the end of communication; and (3) Only a limited range of services are available for packet terminals which meet the service conditions allocated to the PBX as a subscriber terminal of the public ISDN switching system in the network, because the D channel information transmitted from the packet terminal is only passed through to the network without any conversions.

SUMMARY OF THE INVENTION

The present invention solves the above problems, by providing a D channel packet communication system and a method of D channel packet communication, which are capable of identifying a D channel packet and converting the connection control information contained in the D channel packet sent from one side of the PX (e.g., the packet terminal) to a suitable value of connection control information to be sent to the other side of the PBX (e.g., the network), without passing through the call processor.

To do this, the D channel packet communication system according to this invention is implemented in a PBX that includes a plurality of line circuits, each connecting a plurality of subscriber lines at terminals of the PBX, a plurality of trunk circuits, each connecting a plurality of subscriber lines of a public ISDN switching system in a network, a time division switch for providing connection paths between the line circuit and the trunk circuit and a call processor for controlling the overall operations of the PBX. In particular, the inventive system comprises a conversion control unit, a plurality of first switching control units, a plurality of second switching control units and a plurality of permanent connection paths in the time division switch.

Each first switching control unit is a part of the line circuit and connects to a packet terminal via a subscriber line of the PBX. These first switching units discriminate a D channel packet from received D channel information, and transfers the D channel packet to the conversion control unit. If the D channel information is other than a D channel packet, the D channel information is transferred to the call processor.

Each second switching control unit is a part of the trunk circuit and connects to a subscriber line of the public ISDN switching system in the network. These second switching units discriminate a D channel packet from received D channel information, and transfers the D channel packet to the conversion control unit via the permanent connection path. If the D channel information is other than a D channel packet, the D channel information is transferred to the call processor.

The conversion control unit is a part of the line circuit, and comprises means for receiving first conversion information, means for deriving second conversion information and converting means. The first conversion information includes first connection control information which is allocated to the D channel packet transferred between the packet terminal and the PBX, and second connection control information which is allocated to the D channel packet transferred between the PBX and the network. The first conversion information is generated and managed in the call processor, and sent to the conversion control unit before starting D channel communication. The second conversion information deriving means derives second conversion information which has correspondences between the first connection control information and the second connection control information at the beginning of the sequence of D channel packet communication based on the first conversion information. The converting means converts the first connection control information in the D channel packet received from the packet terminal to the second connection control information for the D channel packet to be sent to the network, and also converts the second connection control information in the D channel packet received from the network to the first connection control information for the D channel packet to be sent to the packet terminal, based on the second conversion information.

The converted D channel packet from the packet terminal is transferred to the network through a permanent connection path which permanently connects the conversion control unit to one of the second switching control units.

If the D channel packet communications is performed by the network, third conversion information is generated in the call processor at the beginning of the sequence of the D channel communication, and transferred to the conversion control unit. The third conversion information has correspondences between a part of the first connection control information contained in D channel information sent from the packet terminal and a part of the second connection control information contained in D channel information sent from the network. The third conversion information is used together with the first conversion information to derive the second conversion information in the conversion control unit when the PBX is at the receiving side of the D channel packet communication.

A method of D channel packet communication according to the invention comprises the steps of generating first conversion information, receiving D channel information sent from the packet terminal and identifying a D channel packet, driving second conversion information based on the first conversion information and connection control information contained in the identified D channel packet upon beginning a sequence of D channel packet communication, and converting first connection control information in a D channel packet received from the packet terminal to second connection control information for a D channel packet to be sent to the network or received therefrom.

A more complete understanding of the present invention and many of its attendant advantages will be more readily attained from the following detailed description when considered in connection with the accompanying figures.

BRIEF DESCRIPTION OF THE DRAWINGS

FIG. 4 is a sequence diagram showing the operation of the D channel packet communication system of FIG. 3;

FIG. 5 is a data table showing an example of the configuration of first conversion data for a line side according to the present invention;

FIG. 6 is a data table showing an example of the configuration of first conversion data for a trunk side according to the present invention;

DETAILED DESCRIPTION OF PREFERRED EMBODIMENTS

Figure 1:
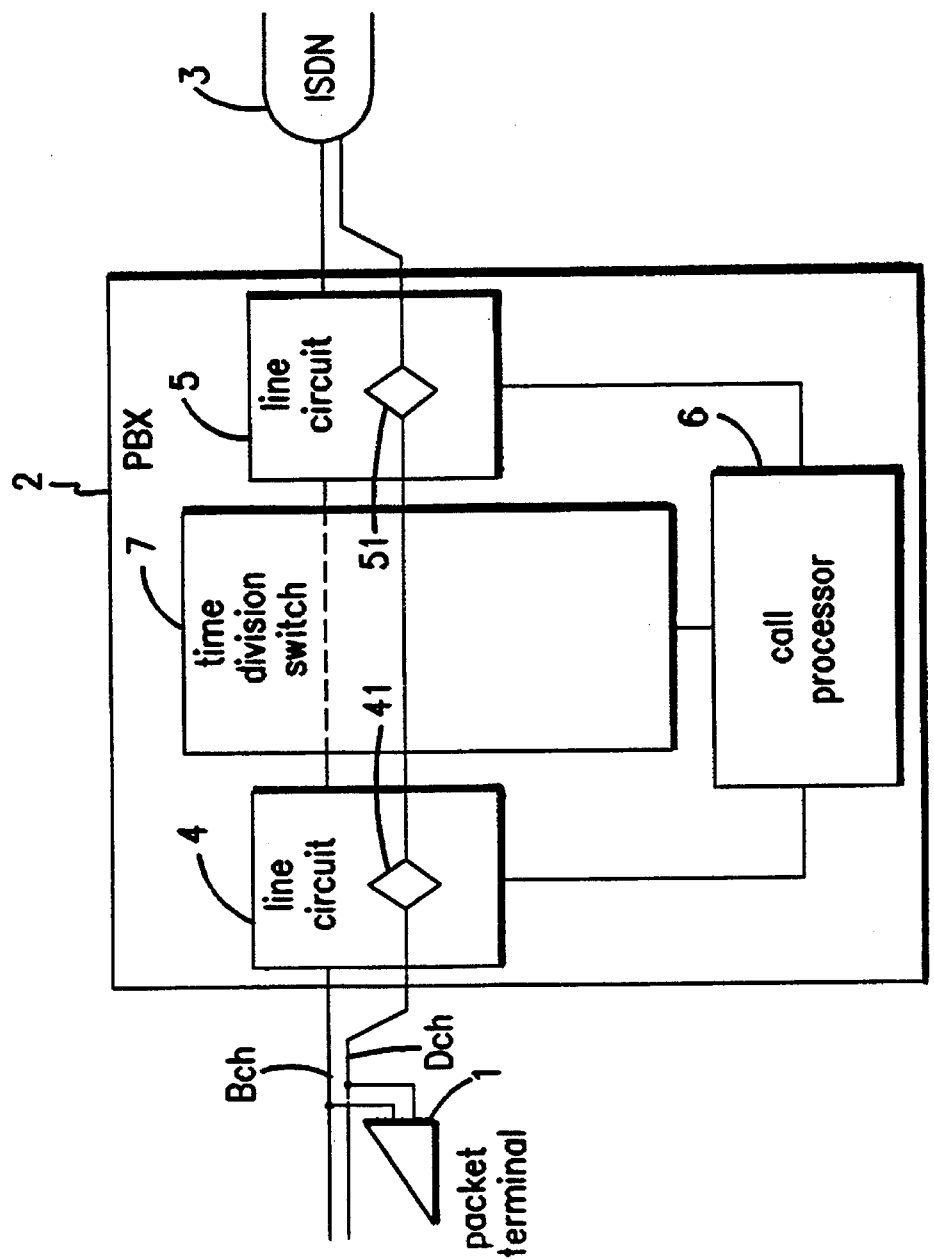
FIG. 1 is a schematic block diagram illustrating a convention D channel packet communication system in a private branch exchange.
Figure 2:
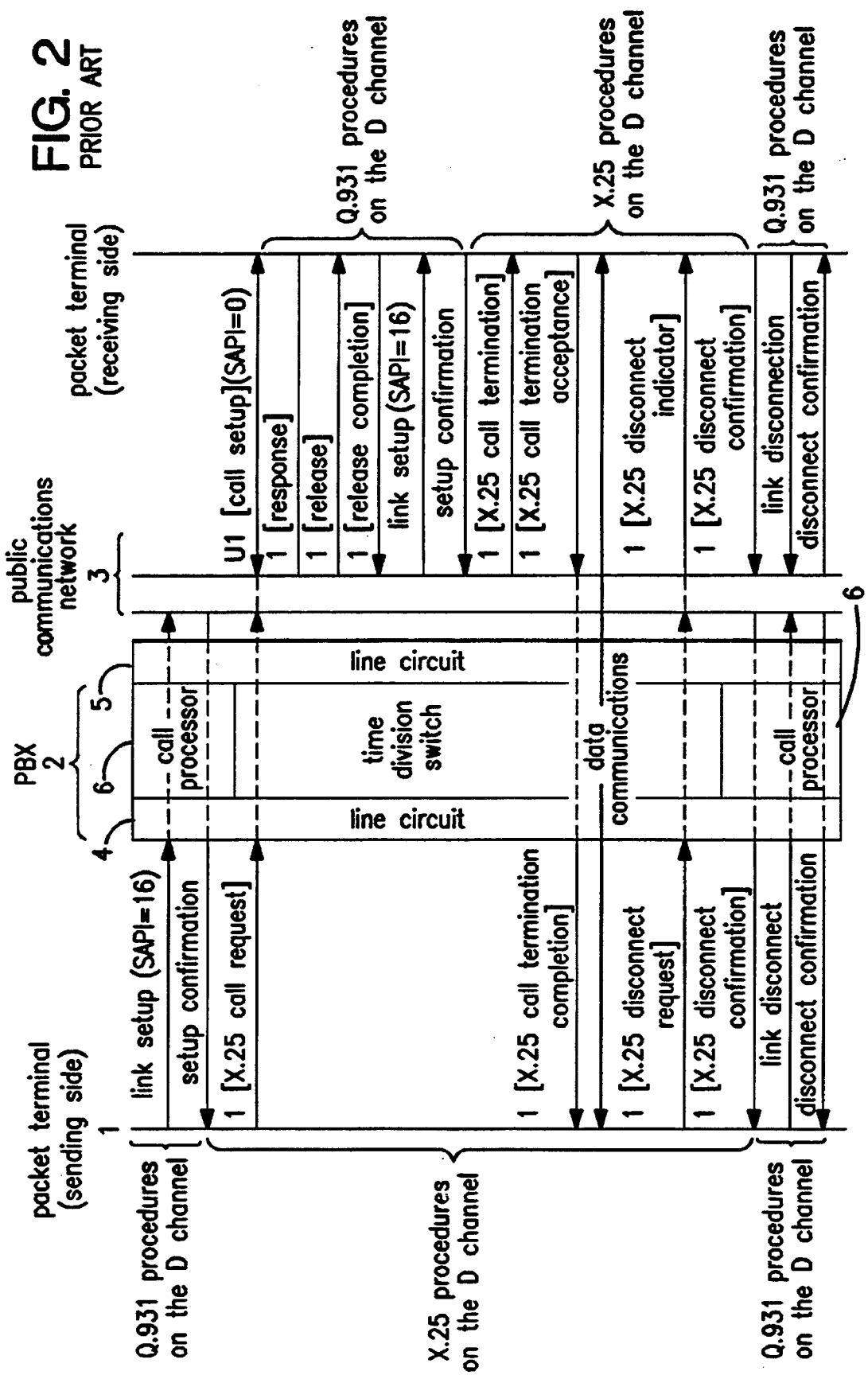
FIG. 2 is a sequence diagram showing the operation of a conventional D channel packet communication system in the private branch exchange of FIG. 1.
Figure 3:
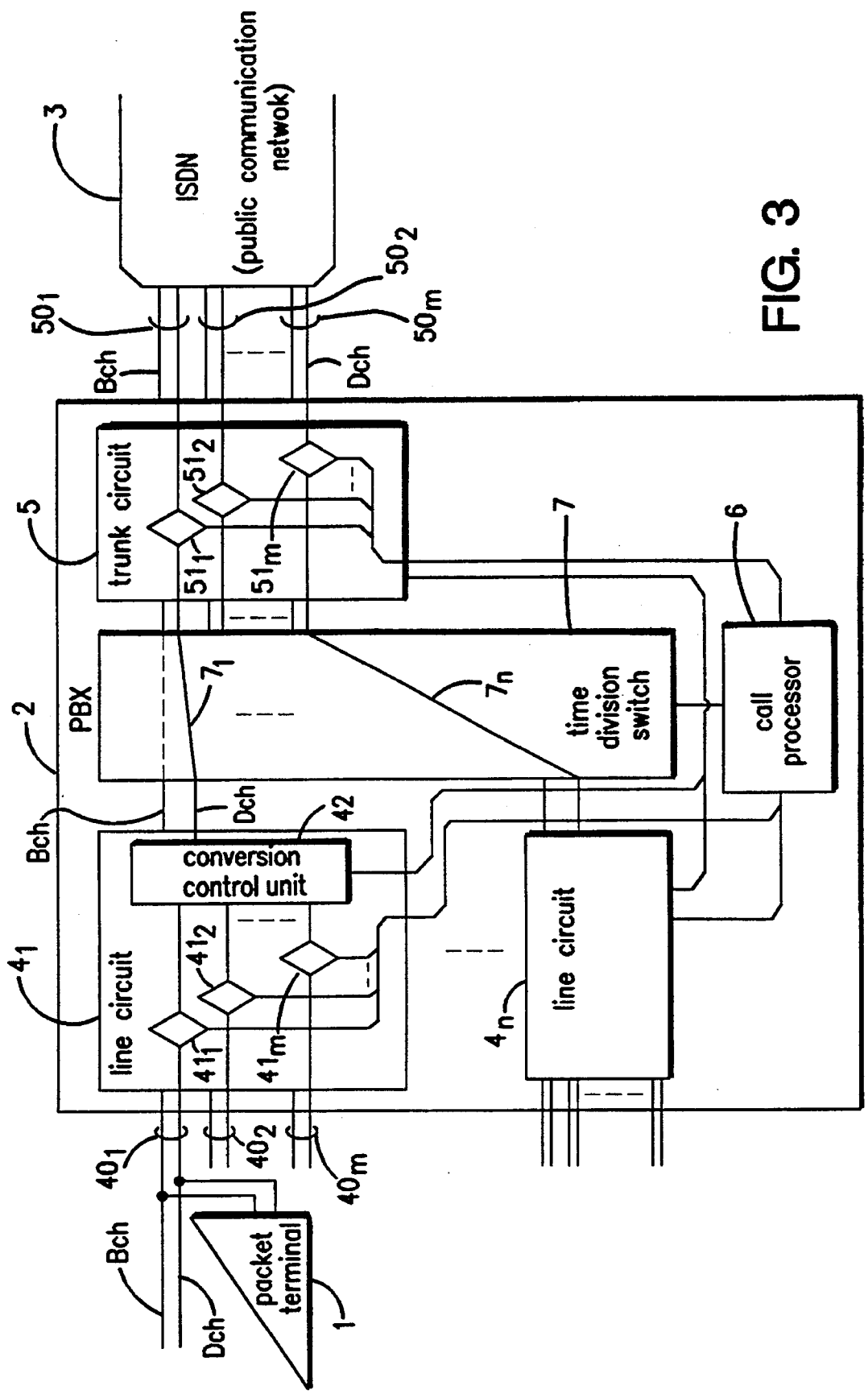
FIG. 3 is a schematic block diagram illustrating the D channel packet communication system according to an embodiment of the present invention.

FIG. 3 is a block diagram illustrating a D channel packet communication system according to the present invention in a PBX which has ISDN capability. The PBX 2 comprises a plurality of line circuits $4_1$ to $14_n$, a plurality of trunk circuits (only one trunk circuit 5 is shown), a time division switch 7 and a call processor 6. A packet terminal 1 is connected to a line circuit $4_l$ by subscriber line $40_l$, having a B channel and a D channel, and the PBX 2 is connected to the network 3 (a public communications Network) by subscriber lines $50_l$ to $50_m$, each having a B channel and a D channel, of a public ISDN switching system (not shown) through the trunk circuit 5 of the PBX 2.

Each line circuit such as a line circuit $4_l$ accommodates a plurality of subscriber lines $40_l$ to $40_m$ of the PBX 2 for connecting packet terminals, and multiplexes signals from those lines by a conversion control unit 42 for transmission to a time division switch 7. The opposite direction signals from the time division switch 7 are also demultiplexed by the conversion control unit 42 and distributed to a plurality of subscriber lines $40_l$ to $40_m$.

The conversion control unit 42 has another function of converting different types of connection control information for D channel packet communication. In particular, there are two types of connection control information for the D channel packet communication. They are connection control information for the line side which is contained in the D channel packet information transferred between the packet terminal 1 and the PBX 2, and for the trunk side which is contained in the D channel packet information transferred between the PBX 2 and the network 3. Details of the connection control information will be described later.

First switching control units $41_l$ to $41_m$ are also provided in the line circuit $4_l$. Each first switching control unit corresponds to a subscriber line of the PBX 2, and controls switching of D channel information to either the call processor or the conversion control unit (time division switch side).

Each trunk circuit such as trunk circuit 5 accommodates subscriber lines $50_l$ to $50_m$, each having a B channel and a D channel, of a public ISDN switching system (not shown) and includes second switching control units $51_l$ to $51_m$. Each second switching control unit corresponds to a subscriber line of the public ISDN switching system (not shown) in the network 3, and controls switching of D channel information to either the call processor or the time division switch.

The time division switch 7 provides permanent connection paths, $7_l$ to $7_n$, which connects each of the conversion control units 42 of the line circuits $4_l$ to $4_n$ to a respective one of the second switching control units $51_l$ to $51_m$ of the trunk circuit 5.

A call processor 6 controls the overall operations of the PBX 2.

In the ISDN user-network interface, generally, the following connection management is performed between a subscriber terminal (user) and an ISDN switching system (network).

In the layer 2 of the ISDN user-network interface protocol, a TEI (Terminal Equipment Identifier) is used to identify each subscriber terminal which transmits and receives D channel information, and the TEI is stored in the address part of the D channel information and transferred between the subscriber terminal and the network. The TEI, in general, is allocated to each subscriber terminal by the ISDN switching system (network) which accommodates the subscriber terminal. However, the PBX itself is also an ISDN switching system and it also can allocate TEIs to terminals which are accommodated in the PBX.

The X.25 protocol which defines the protocol of packet communications includes a LCGN (Logical Channel Group Number) and a LCN (Logical Channel Number) which are used as control information for packet multiplexing. The LCGN and the LCN are used to identify each of a plurality of communication links multiplexed on a transmission path, and it allows multiplexing of packets having a different destination. The packet multiplexing control information of the LCGN and the LCN can also be allocated independently between the line side (between the packet terminal and the PBX) and the network side (between the PBX and the network).

The TEI, LCGN and LCN information constitutes the connection control information, and there are two types of connection control information (the line side information and the network side information) as described above to provide flexible use of terminals accommodated in the PBX. Although connection control information transferred between the PBX and the terminal of the PBX can be freely defined within the PBX, the connection control information transferred between the PBX and the network should comply with service conditions contracted to the network as far as the PBX is one of many subscriber terminals of the network.

Therefore, it is necessary for the PBX to manage correspondences between the connection control information of the line side and the network side, and three types of conversion information (first to third conversion information) are provided in the PBX for this purpose.

The first conversion information is managed by the call processor 6 based on service conditions of terminals accommodated in the PBX and service conditions of the PBX contracted to the network 3. The first conversion information is transferred to the line circuit $4_l$ and the trunk circuit 5 from the call processor 6 before D channel packet communication is executed, and it is stored in the line circuit $4_l$ and the trunk circuit 5. The first conversion information is used to drive the second conversion information which converts the connection control information contained in the D channel packet information transferred at the network side and the line side appropriately for allowing flexible service allocation to terminals accommodated in the PBX 2 when the D channel packet communication is initiated.

FIGS 5 and 6 show the first conversion information of the line side and the trunk side (network side), respectively. The first conversion information of both the line side of FIG. 5 and the trunk side of FIG. 6 are transferred to line circuit $4_l$, whereas only the first conversion information of the trunk side of FIG. 6 is transferred to trunk circuit 4.

The first conversion information of the line side of FIG. 5 shows one block of information which includes the subscriber line number, the TEI of the subscriber terminals (the TEI allocated to the subscriber terminal by the PBX 2), the TEI of the network side (the TEI allocated to the PBX 2 of the network 3), the LCGN of the terminal side, the type of connection whether a VC (Virtual Circuit) or a PVC (Permanent Virtual Circuit) and the number of multiplexible LCNs. The type of connection (VC/PVC) and the number of multiplexible LCNs are provided for each LCGN (LCGN= 00 to LCGN=15) of the terminal side. There are the same number of blocks of information as the number of TEIs used in a corresponding subscriber line of the PBX 2.

The first conversion information of the trunk side of FIG. 6 shows one block of information which includes the TEI of the network side (the TEI allocated to the PBX 2 by the network 3), the LCGN of the network side, the type of connection whether a VC or a PVC and the number of multiplexible LCNs. The type of connection (VC/PVC) and the number of multiplexible LCNs are provided for each LCGN (LCGN=00 to LCGN=15) of the network side. There are the same number of blocks of information as the number of TEIs allocated to the PBX 2.

The second conversion information is derived when the D channel packet communication is commenced. The second conversion information has correspondences between the connection control information of the line side and the network side, and is used to convert the connection control information of the line side contained in the D channel packet information of the network side to be contained in the D channel packet information sent to the network 3 for the D channel packet communication, or received therefrom.

The D channel packet communication procedures of the PBX on the sending side will now be described referring to FIG. 4 to explain how the two types of conversion information of the first and second conversion information are used.

In particular, FIG. 4 is a diagram showing the operation of a D channel packet communication system in a PBX according to the embodiment of the present invention.

The packet terminal 1 of the sending side transmits the "link set up" information based on the Q.931 protocol to the line circuit $4_l$ and D channel information, and this information includes SAPI set to "16" so as to request D channel packet communication based on the X.25 protocol.

The line circuit $4_l$ receives the D channel information from the packet terminal 1 and terminates the protocol of layer 2. As the result of termination of the layer 2 protocol, the SAPI=16 signal is identified and the "link set up confirmation" information is sent back to the packet terminal 1. At this time the first switching control unit $41_l$ establishes a path to the trunk circuit 5 through the conversion control unit 42 and the permanent connection path $7_l$ of the time division switch 7, and the second switching control unit $51_l$ in the trunk circuit 5 also establishes a path to the permanent connection path $7_l$ of the time division switch 7. The permanent connection path $7_l$ between the line circuit $4_l$ and the trunk circuit 5 has been established by the call processor 6 based on permanent connection path management information.

The trunk circuit 5 transmits the "link set up" information based on the Q.931 protocol to the network 3. In this "link set up" information, the value of "16" is set to indicate that D channel packet communication based on X.25 protocol is being requested and the TEI allocated to the PBX 2 by the network 3 is used which is written in the first conversion information of the trunk side of FIG. 6.

The network 3 receives the "link set up" information and terminates the layer 2 protocol, and sends back the "link set up confirmation" information to the trunk circuit 5.

After the link set up has completed, the packet terminal 1 transfers the "X.25 call request" information, and this request information is received by the line circuit $4_l$. The value set in the SAPI is "16". This information is transferred to the conversion control unit 42 through the first switching unit $41_l$.

The conversion control unit 42 recognizes that this information is the "X.25 call request" information by a packet identifier contained in the D channel packet information, and obtains the LCGN and LCN contained in the "X.25 call request" information. With the first conversion information, the conversion control unit 42 derives second conversion information comprising a TEI, a LCGN and a LCN of the network side which corresponds to the TEI of the packet terminal 1, the subscriber line number and the LCGN and LCN obtained from the "X.25 call request" information. Then, the conversion control unit 42 modifies the connection control information of the "X.25 call request" information based on the derived second conversion information to match the connection control information in the network side, and transmits the modified "X.25 call request" information to the network 3 through the permanent connection path $7_l$ of the time division switch 7 and the trunk circuit 5. At the same time the second conversion information is stored in the conversion control unit 42.

A method of deriving the second conversion information will now be described with reference to FIG. 7.

Figure 7A:
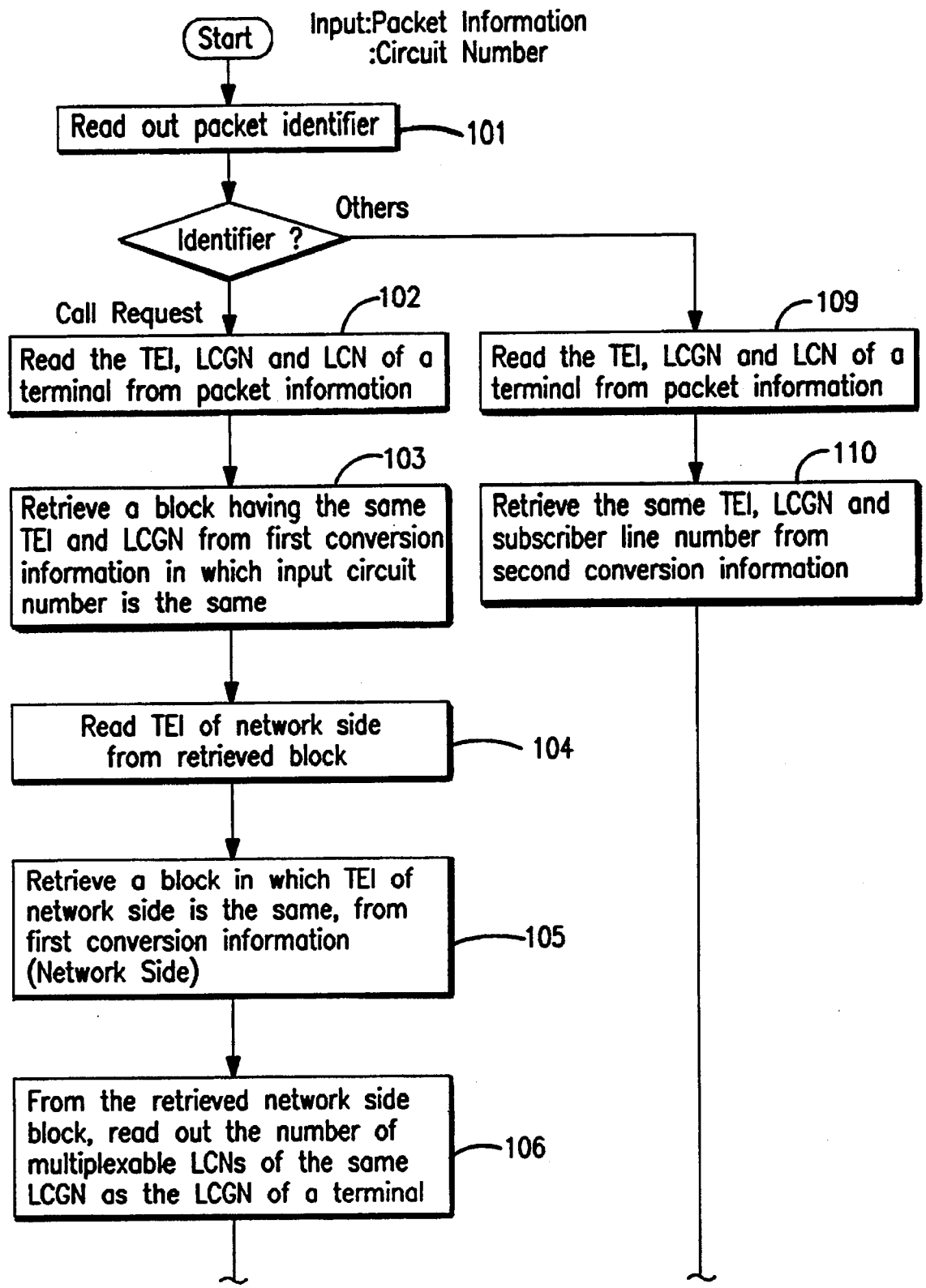
FIG. 7 is a flow chart illustrating data conversion for the network side information at the conversion control unit according to the present invention.
Figure 7B:
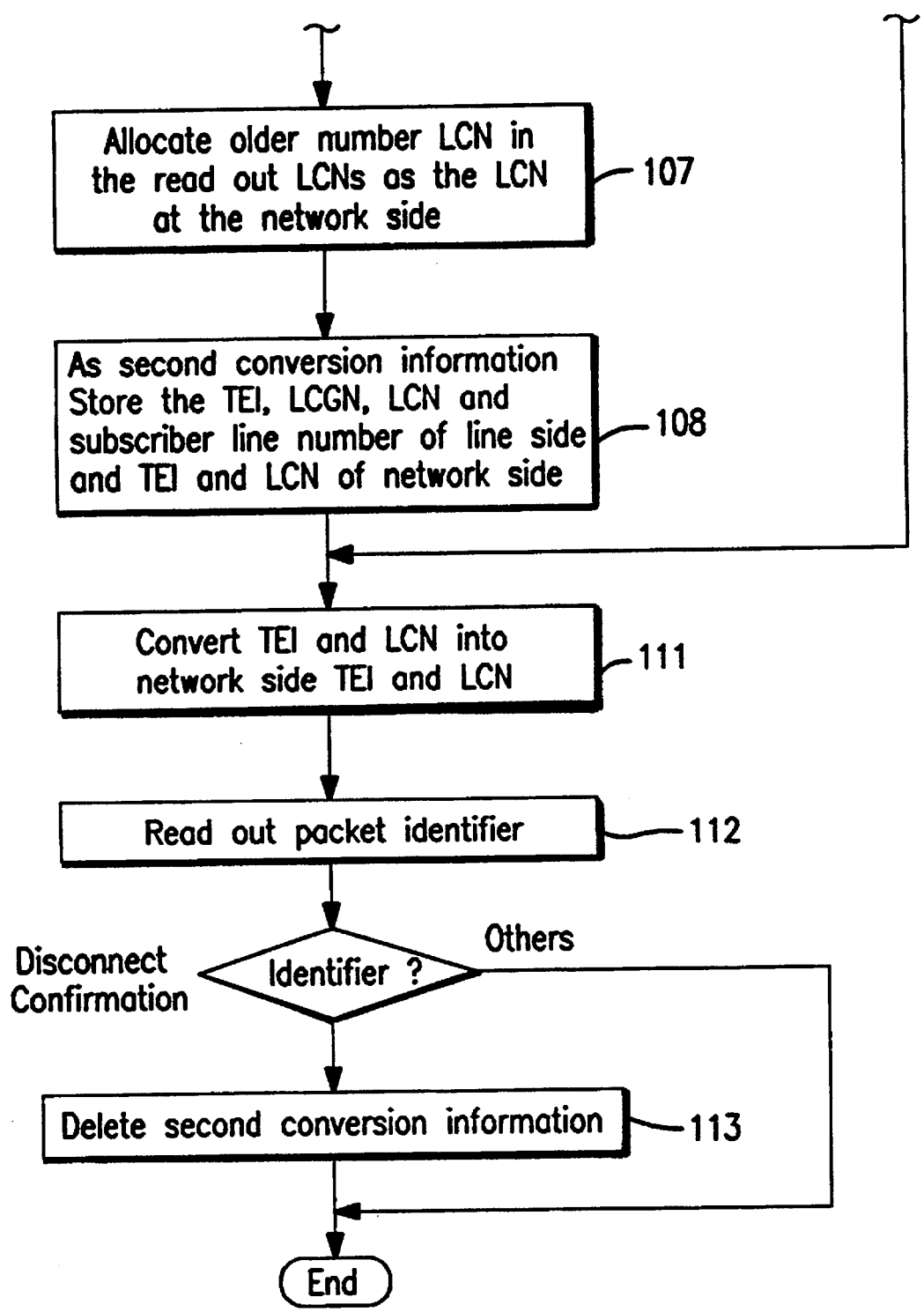

FIG. 7 is a flow chart illustrating the operation of data conversion for the network side information (the second conversion information) at the conversion control unit 42 according to the present invention.

A packet identifier contained in the D channel packet information sent from the packet terminal 1 is read out (step 101). If the packet identifier indicates a call request, the TEI, LCGN and LCN of the packet terminal 1 is read out from the D channel packet information (step 102). An information block having the same TEI and LCGN as those of the packet terminal 1 is retrieved from the first conversion information of the line side of FIG. 5 which has the same subscriber line number as an input circuit number (step 103), and the TEI of the network side (the TEI allocated to the PBX 2 by the network 3) in the retrieved information block is read out (step 104).

Next, an information block having the same TEI as the network side is retrieved from the first conversion information of the trunk side of the FIG. 6 (step 105), and then, the number of multiplexible LCNs is read out from a sub-clock, whose LCGN coincides with the LCGN of the packet terminal 1, in the retrieval information block (step 106). Next, an LCN is allocated, which is less than the number of LCNs read out and which has not been used so far, as the LCN at the network side (step 107). A larger number is to be selected as the LCN here. For example, if the number of multiplexible LCNs read out from the first conversion information is "10" and so far LCN=0, 1, 4, 6 and 9 have been used, the LCN to be allocated at the network side is "8". The TEI, LCGN, LCN and the subscriber line number at the lien side, and the TEI and LCN at the network side are stored as the second conversion information (step 108). The LCGN is not converted and the same LCGN is used at both line side and network side.

If the packet identifier read out at step 101 is other than a call request, it means that the D channel packet information sent from the packet terminal 1 is information sent to the line circuit $4_l$ at a later stage of packet communication, and the second conversion information has already been obtained and stored. Therefore, the TEI, LCGN and LCN of the packet terminal 1 is read out from the D channel packet information (step 109), and the stored second conversion information is retrieved using this information to obtain second conversion information which has the same TEI, LCGN, LCN and subscriber line number as those of the packet terminal (step 110).

Then, the TEI and LCN are converted to those of the network side for transmitting the D channel packet information to the network 3 (step 111). The packet identifier is again read out (step 112), and if the packet identifier indicates a disconnect confirmation, then the D channel packet information sent from the packet terminal 1 is at the final stage of packet communication and the second conversion information is no longer required for this packet communication, and so it is deleted (step 113).

Thereafter, the converted "X.25 call request" information sent to the network 3 is received by a PBX at the receiving side, and link set up procedures based on the Q.931 protocol and call termination procedures based on the X.25 protocol are performed at the receiving side PBX and a packet terminal. Then, the "X.25 call termination acceptance" information is sent back from the packet terminal of the receiving side to the conversion control unit 42 through the opposite route.

When the conversion control unit 42 receives the "X.25 call termination acceptance" information from the packet terminal of the receiving side through the network 3, it obtains a TEI, a LCGN and a LCN which are contained in the "X.25 call termination acceptance" information as the network side information, and the conversion control unit 42 converts that connection control information of the network side into corresponding line side information by referring to the second conversion information. Then, the conversion control unit 42 converts the "X.25 call termination acceptance" information into the "X.25 call termination completion" information including a TEI, a LCGN and a LCN of the converted connection control information of the line side. The "X.25 call termination completion" information is demultiplexed and transferred to the packet terminal 1 of the sending side through the line circuit $4_l$. D channel packet communication between the packet terminal 1 of the sending side and the packet terminal of the receiving side then commences.

During the D channel packet communication, the connection control information of each D channel packet information is also converted between the line side information and the network side information based on the second conversion information by the conversion control unit 42.

At the end of the D channel packet communication, the "X.25 disconnect request" information is transferred from the packet terminal 1 of the sending side, and the network 3 transfers the "X.25 disconnection indicator" information to the packet terminal of the receiving side. In response to this information, the packet terminal of the receiving side sends back the "X.25 disconnect confirmation" information to the packet terminal 1 of the sending side through the network 3, and the D channel packet communication is ended. The conversion control unit 42 deletes the second conversion information when the "X.25 disconnect confirmation" information is acknowledged because the second conversion information for this packet communication is not longer required.

After the D channel packet communication based on the X.25 protocol is completed, the "link disconnection" information of the Q.931 protocol is transferred to the network 3 to request the link disconnection at both sides of the network 3, i.e. the packet terminal 1 of the sending side and the packet terminal of the receiving side. The network 3 then disconnects the link and transfers the "disconnect confirmation" information to both packet terminals.

The operation of the receiving side PBX during D channel packet communication using the second and third conversion information, will now be described with reference to FIGS. 3 and 4. Assume that the PBS 2 of FIG. 3 is now the receiving side PBX, and a packet call is transmitted from a packet terminal of a sending side (not shown) in the network 3 and received by the packet terminal 1. The sequence of D channel packet communication at the receiving side is shown on the right side of FIG. 4.

When the packet terminal of the sending side transmits the "X.25 call request" information for initiating D channel packet communication, a public ISDN switching system at the receiving end (not shown) in the network 3 selects one of subscriber lines $50_l$ to $50_m$ of the public ISDN switching system corresponding to a destination number contained in the "X.25 call request" information. Then, the public ISDN switching system transmits the "call set up" information to the D channel of the selected subscriber line based on the Q.931 protocol The "call set up" information is transmitted on the UI frame (one of the frames types used in the layer 2 protocol) which does not specify the destination terminal, and the value of "0" is set in the SAPI.

The trunk circuit 5 of the PBX 2 receives the "call set up" information and analyzes the SAPI. In this case, as the value of SAPI is "0" and the protocol is based on the Q.931 protocol, the "call set up" information is transferred to the call processor 6 through the second switching control unit 51. The call processor 6 analyzes the content of the "call set up" information to identify the requested terminal and the type of communication, and confirms that the type of communication is D channel packet communication and, for example, the call is to be received by packet terminal 1. Then, the call processor 6 transmits the "call set up" information to the packet terminal 1 through the subscriber line $40_1$ of the PBX 2.

The packet terminal 1 receives the "call set up" information and determines whether it responds to the call set up request. When responding, the packet terminal 1 sends back the "response" information which includes the TEI allocated to its own terminal and the SAPI having a value of "0". The lien circuit $4_l$ which has received the "response" information transfers the information to the call processor 6 through the first switching control unit $41_l$, as the value of SAPI is "0".

The call processor 6 now recognizes the TEI and subscriber line number corresponding to the packet terminal 1, and its relation to the TEI of the network side contained in the "call set up" information. Then, the call processor 6 stores the TEI and subscriber line number corresponding to the packet terminal 1 and the TEI of the network side as the third conversion information, and the call processor 6 transfers the "response" information which is followed by the "release" information from the network 3.

The third conversion information is transferred from the call processor 6 to the conversion control unit 42 at the time when the call processor 6 receives the "release completion" information from the packet terminal 1. That is, the "release completion" information follows the "release" information and ends the procedures of the Q.931 protocol.

In this way, the TEI of the packet terminal 1 at the receiving side is obtained by procedures of the Q.931 protocol and the third conversion information is stored in the conversion control unit 42 in the line circuit $4_l$ which accommodates the packet terminal 1. The third conversion information is intermediate information effecting a linkage between the connection control information contained in the D channel packet information sent from the network 3 and the connection control information contained in the first conversion information for deriving the second conversion information in the conversion control unit 42.

At this time, if the link for D channel packet communication has not yet been established, the "link set up" information with SAPI=16 is transmitted from the line circuit $4_l$ to the packet terminal 1 based on the Q.931 protocol. The packet terminal 1 receives the "link set up" information and responds by sending back the "link set up confirmation" information with SAPI=16 based on the Q.931 protocol. As a result, the line circuit $4_l$ confirms that the link for D channel packet communication has not been established and the first switching control unit $41_l$ switches the connection from the call processor side to the conversion control unit side.

Thereafter, the "X.25 call termination" information with SAPI=16 based on the X.25 protocol sent from the network 3 is received by the trunk circuit 5 and transferred to the conversion control circuit 42 through the second switching control unit $51_l$ and the permanent connection path $7_l$.

The conversion control unit 42 identifies that this information is the "X.25 call termination" information by a packet identifier contained in the D channel packet information, and obtains the TEI, the LCGN and LCN contained in the "X.25 call termination" information as the connection control information of the network side. With the first conversion information and the third conversion information which includes the TEI and the subscriber line number corresponding to the packet terminal 1 and the TEI of the network side, the conversion control unit 42 derives the second conversion information comprising at TEI, a LCN and the subscriber line number of the packet terminal side (line side) which corresponds to the TEI, the LCGN and LCN of the network side obtained from the "X.25 call termination" information. The, the conversion control unit 42 modifies the connection control information of the "X.25 call termination" information based on the derived second conversion information to match the connection control information in the line side, and transmits the modified "X.25 call termination" information to the packet terminal 1 through the line circuit $40_l$. At the same time the second conversion information is stored in the conversion control unit 42.

A method of deriving this second conversion information will now be described with reference to FIG. 8.

Figure 8A:
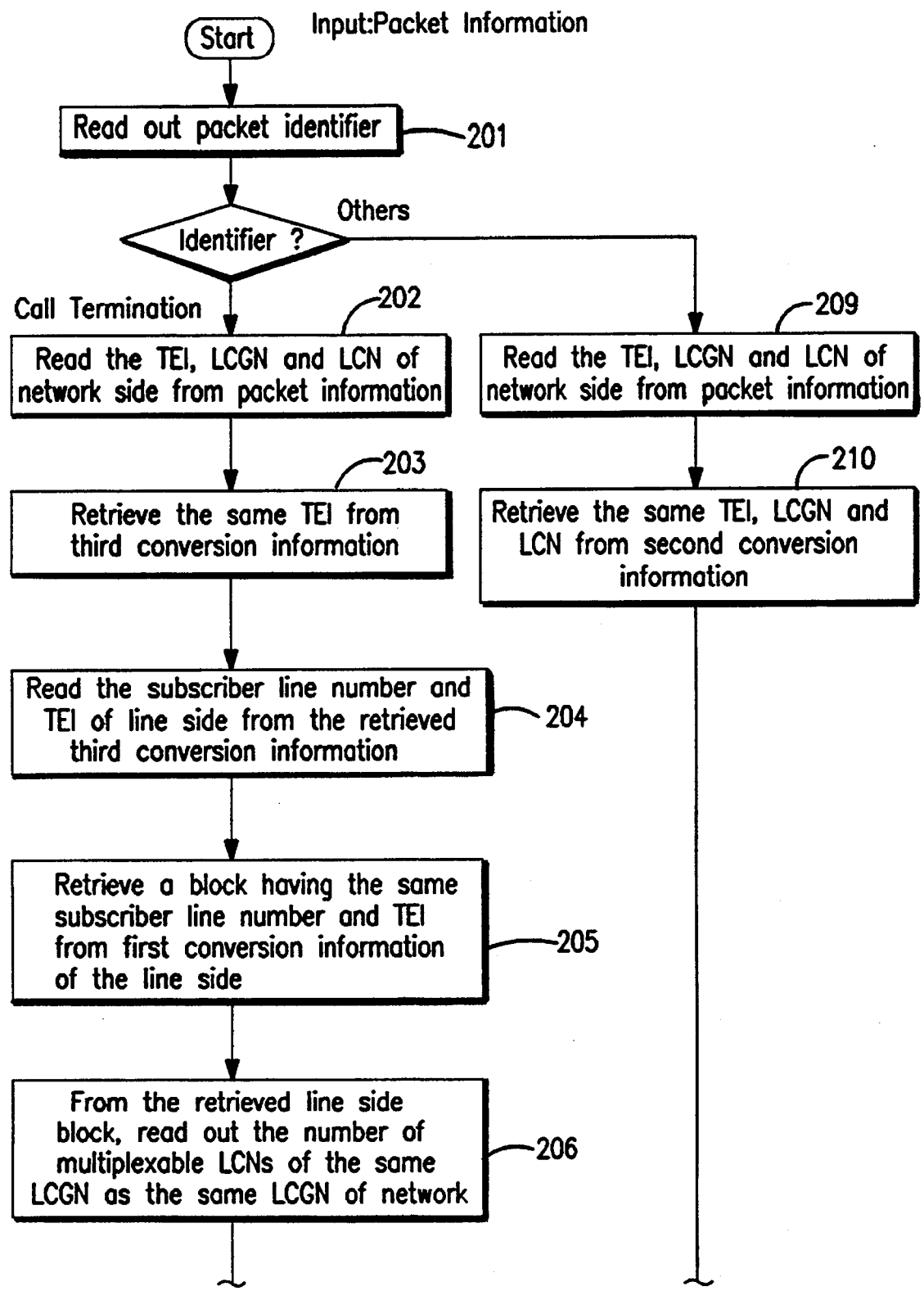
FIG. 8 is a flow chart illustrating data conversion for the line side information at the conversion control unit according to the present invention.
Figure 8B:
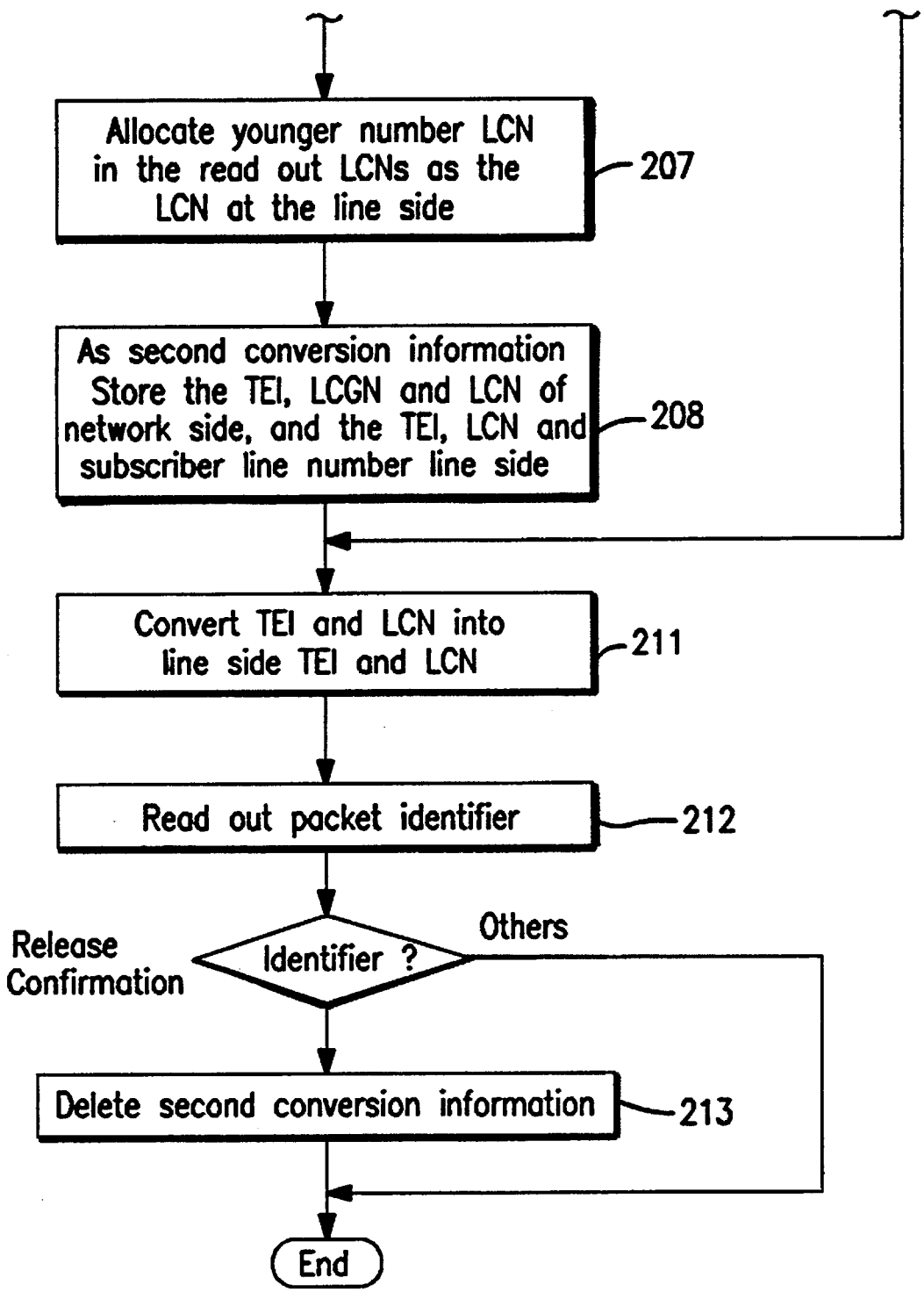

FIG. 8 is a flow chart illustrating data conversion for the line side information (the second conversion information) at the conversion control unit 42 according to the present invention.

A packet identifier contained in the D channel packet information sent from the network 3 is read out (step 201). If the packet identifier indicates an incoming call (call termination), the TEI, LCGN and LCN of the network side is read out from the D channel packet information for deriving the second conversion information (step 202). Third conversion information having the same TEI as that of the network side is retrieved (step 203), and the TEI and the subscriber line number of the line side from the retrieved third information is read out (step 204). Next an information block having the same TEI and the subscriber line number of the line side is retrieved from the first conversion information of the line side of FIG. 5 (step 205), and the, the number of multiplexible LCNs is read out from a sub block, whose LCGN coincides with the LCGN of the network side, in the retrieved information block (step 206). An LCN is then allocated, which is less then the number of LCNs read out and which has not been used so far, as the LCN at the line side (step 207). A smaller number is to be selected as the LCN here. For example, if the number of multiplexible LCNs read out from the first conversion information is "10" and so far LCN=0, 1, 4, 6, and 9 have been used, the LCN to be allocated for the line side is "2". The TEI, LCGN, LCN of the network side and TEI, LCN and the subscriber line number at the line side are stored as the second conversion information (step 208).

If the packet identifier read out at step 201 is other than a call termination, it means that the D channel packet information sent from the network 3 is information at a later stage of packet communication, and the second conversion information has already been obtained and stored. Therefore, the TEI, LCGN and LCN of the network side is read out from the D channel packet information (step 209), and the stored second conversion information is retrieved using this information to obtain second conversion information which has the same TEI, LCGN and LCN as those of the network side (step 210).

Then, the TEI and LCN are converted to those of the line side for transmitting the D channel packet information to the packet terminal 1 (step 211). The packet identifier is again read out (step 212), and if the packet identifier indicates a disconnect indication, then the D channel packet information sent from the network 3 is at the final stage of packet communication and the second conversion information is no longer required for this packet communication and so it is deleted (step 213).

Returning now to the sequence of packet communication shown in FIG. 4, after the converted "X.25 call termination" information has been sent to the packet terminal 1, the "X.25 call termination acceptance" information with SAPI=16 as the response is sent back from the packet terminal 1 to the network 3 through the opposite route, i.e., through the first switching control unit 41 $_1$, through the conversion control unit 42 which converts the connection control information contained in the "X.25 call termination acceptance" information to the network side information based on the second conversion information through the permanent connection path 7 $_1$, the trunk circuit 5 and the subscriber line 50 $_1$ of the network. Thereafter, D channel packet communication is commenced between the packet terminals of the sending side and the receiving side.

As described above, the connection control information in the D channel packet information transferred between the network 3 and the PBX 2, and between the PBX 2 and the packet terminal 1 is converted into a usable content at the conversion control unit 42 based on the second conversion information. Also, after the D channel packet communication is completed, the link disconnect procedures and deletion of the second conversion information are performed in a similar manner to the procedures described in the packet sending operation.

When service conditions of the contract for connecting the PBX 2 to the network 3 (i.e., allocation of TEI, LCGN or LCN of the network side) or conditions of packet terminal 1 accommodated by the line circuit 4 $_1$ (i.e., allocation of TEI, LCGN or LCN of the line side) are changed, the first conversion information corresponding to the change is input from a maintenance terminal (not shown) of the PBX 2, and the call processor updates the stored first conversion information and also transfers the updated first conversion information to the line circuit 4$_1$ and the trunk circuit5.

As described above the present invention does not require processing of D channel packet communication by the call processor, once the conversion information has been derived. Therefore, the present invention permits a PBX in which the load of the call processor during D channel packet communication is reduced and the efficiency of the time division switch and trunk circuit is improved.

Although the present invention has been fully described with reference to preferred embodiments thereof, numerous changes and modifications will be apparent to those having in this field. Therefore, unless these changes and modifications otherwise depart from the scope of the present invention, they should be construed as included therein.

I claim:

1. A D channel packet communication system in a private branch exchange having a plurality of line circuits, each one of said plurality of line circuits connecting a plurality of subscriber lines for packet terminals to said private branch exchange, a plurality of trunk circuits, each one of said plurality of trunk circuits connected to a plurality of subscriber lines of a public ISDN switching system in a network, a time division switch for providing connection paths between each one of said plurality of line circuits and each one of said plurality of trunk circuits and a call processor for controlling overall operations of said private branch exchange, said D channel packet communication system comprising:

a conversion control unit comprising means for receiving first conversion information including first connection control information allocated to a D channel packet transferred between one of said packet terminals and said private branch exchange, and second connection control information allocated to D channel packet transferred between said private branch exchange and said network;

means for deriving second conversion information having correspondences between said first connection control information and said second connection control information at a beginning of D channel packet communication based on said first conversion information, said deriving means cooperating with said receiving means; and converting means for converting said first connection control information in said D channel packet received form one of said packet terminals to said second connection control information for a D channel packet to be sent to said network, converting said second connection control information in said D channel packet received from said network to said first connection control information for said D channel packet to be sent to one of said packet terminals, based on said second conversion information, said converting means cooperating with said receiving means;

a plurality of first switching control units, each one of said plurality of first switching control units connecting to one of said plurality of subscriber lines for one of said packet terminals, identifying D channel information received from one of said packet terminals, establishing a path to said conversion control unit where a D channel packet is being received, and establishing a path to said call processor where information other than said D channel packet is being received;

a plurality of second switching control units; each one of said plurality of second switching control units connected to one of said plurality of subscriber lines of said public ISDN switching system, identifying D channel information from said public ISDN switching system, establishing a path to said time division switch where a D channel packet is being received and establishing a path to said call processor where information other than said D channel packet is being received; and a plurality of permanent connection paths in said time division switch, each making a permanent connection between said conversion control unit and one of said second switching control units.

2. The D channel packet communication system according to claim 1, wherein one of said plurality of line circuits comprises said conversion control unit and said plurality of first switching control units.

3. The D channel packet communication system according to claim 1, wherein one of said plurality of first switching control units and one of said plurality of second switching control units comprise D channel packet discriminating means for discriminating a D channel packet by a service access point identifier contained in D channel information.

4. The D channel packet communication system according to claim 1, wherein said conversion control unit further comprises:

means for receiving third conversion information having correspondences between a part of said first connection control information contained in D channel information sent from one of said packet terminals and a part of said second connection control information contained in D channel information sent from said network, sent from said call processor at a beginning of D channel communication performed by said network.

5. The D channel packet communication system according to claim 4, wherein said conversion control unit further comprises:

packet type identification means for identifying an initial stage D channel packet and a final stage D channel packet; and second conversion information deleting means for deleting said second conversion information at a final stage of D channel packet communication.

6. The D channel packet communication system according to claim 4, wherein said call processor comprises:

first conversion information management means for deriving said first conversion information based on information of service conditions of one of said packet terminals and service conditions of said private branch exchange, and for sending said derived first conversion information to said conversion control unit and one of said plurality of trunk circuits; and third conversion information management means for deriving said third conversion information based on first D channel information sent from said network and send D channel information sent from one of said packet terminals in response to said first D channel information at a beginning of D channel communication performed by said network, and for sending said derived third conversion information to said conversion control unit.

7. The D channel packet communication system according to claim 6, wherein said cell processor further comprises permanent path establishing means for establishing said plurality of permanent connection paths in accordance with predetermined connection information.

8. A method of D channel packet communication in a private branch exchange having a plurality of line circuits, each one of said plurality of line circuits connecting a plurality of subscriber lines for packet terminals to said private branch exchange, a plurality of trunk circuits, each one of said plurality of trunk circuits connected to a plurality of subscriber lines of a public ISDN switching system in a network, a time division switch for providing connection paths between each one of said plurality of line circuits and each one of said plurality of trunk circuits and a call processor for controlling overall operations of said private branch exchange, said method comprising the steps of:

generating first conversion information including first connection control information allocated to a D channel packet transferred between one of said packet terminals and said private branch exchange, and second connection control information allocated to a D channel packet transferred between said private branch exchange and said network;

receiving D channel information sent from one of said packet terminals and identifying a D channel packet;

deriving second conversion information having correspondence between said first connection control information and said second connection control information based on said first conversion information and connection control information contained in said discriminated D channel packet at a beginning of D channel packet communication; and converting said first connection control information in a D channel packet received from one of said packet terminals to said second connection control information for a D channel packet to be sent to said network, and converting said second connection control information in a D channel packet received from said network to said first connection control information fair a D channel packet to be sent to one of said terminals, based on said second conversion information.

9. A method of D channel packet communication in a private branch exchange having a plurality of line circuits, each one of said plurality of line circuits connecting a plurality of subscriber lines for packet terminals to said private branch exchange, a plurality of trunk circuits, each one of said plurality of trunk circuits connected to a plurality of subscriber lines of a public ISDN switching system in a network, a time division switch for providing connection paths between each one of said plurality of line circuits and each one of said plurality of trunk circuits and a call processor for controlling overall operations of said private branch exchange, said method comprising the steps of:

generating first conversion information including first connection control information allocated to a D channel packet transferred between one of said packet terminals and said private branch exchange, and second connection control information allocated to a D channel packet transferred between said private branch exchange and said network;

generating third conversion information having correspondences between a part of said first connection control information contained in D channel information sent from one of said packet terminals and a part of said second connection control information contained in D channel information sent from said network at a beginning of D channel communication performed by said network;

receiving D channel information and identifying a D channel packet;

deriving second conversion information having correspondences between said first connection control information and said second connection control information based on said first conversion information, said third conversion information and connection control information contained in said discriminated D channel packet at a beginning of D channel packet communication; and converting said second connection control information in a D channel packet received from said network to said first connection control information for a D channel packet to be sent to one of said packet terminals, and converting said first connection control information in a D channel packet received from one of said packet terminals to said second connection control information for a D channel packet to be sent to said network, based on said second conversion information.

\* \* \* \* \*